(12) United States Patent
Lapointe (10) Patent No.: US 9,727,804 B1
(45) Date of Patent: Aug. 8, 2017

(54) METHOD OF CORRECTING STRINGS

(75) Inventor: Jean-Simon Lapointe, Dorval (CA)

(73) Assignee: Matrox Electronic Systems, LTD., Dorval, Quebec (CA)

(*) Notice: Subject to any disclaimer, the term of this patent is extended or adjusted under 35 U.S.C. 154(b) by 1180 days.

(21) Appl. No.: 11/107,644

(22) Filed: Apr. 15, 2005

(51) Int. Cl.
*G06Q 30/02* (2012.01)
*G06K 9/72* (2006.01)

(52) U.S. Cl.
CPC .......... *G06K 9/72* (2013.01); *G06Q 30/0206* (2013.01)

(58) Field of Classification Search
CPC ..... G06K 9/222; G06K 9/344; G06Q 30/0206
USPC ..................... 705/1, 400; 382/229
See application file for complete search history.

(56) References Cited

U.S. PATENT DOCUMENTS

| | | | | |
|---|---|---|---|---|
| 5,689,585 A * | 11/1997 | Bloomberg | ........ | G06K 9/00469 382/229 |
| 6,668,085 B1 * | 12/2003 | Evans | ........ | G06K 9/222 382/229 |
| 2005/0123203 A1 * | 6/2005 | Heilper | ........ | G06K 9/344 382/229 |
| 2007/0053611 A1 * | 3/2007 | Wnek | ........ | G06K 9/00469 382/294 |

OTHER PUBLICATIONS

Zheng, Lihong; Hel, Xiangjian and Le, Yuanzong; "A Comparison of Methods for Character Recognition of Car Number Plates"; Jan. 2005; Proceedings of the 2005 International Conference on Computer Vision, 2005, pp. 33-39.*
Nomura et al., "A Novel Adaptive Morphological Approach for Degraded Character Image Segmentation"; Nov. 2005, vol. 38, Issue 11, pp. 1961-1975.*

* cited by examiner

*Primary Examiner* — Kevin Flynn
*Assistant Examiner* — Freda A Nelson
(74) *Attorney, Agent, or Firm* — Foley & Lardner LLP; James De Vellis (57) ABSTRACT

Determining a set of edit operations to perform on a string, such as one generated by optical character recognition, to satisfy a string template by determining a minimum cost of performing edit operations on the string to satisfy the string template and then determining the set of edit operations corresponding to the minimum cost. Transforming a string to satisfy one or more string templates by determining a minimum cost of performing edit operations on the string to satisfy one or more string templates, selecting one or more minimum costs, determining a set of edit operations corresponding to the minimum costs, and then performing the set of edit operations on the string. Determining a minimum cost of performing edit operations on a string to satisfy a string template by determining set costs of performing sets of edit operations using costs associated with edit operations of the set and determining the minimum cost using the set costs.

30 Claims, 4 Drawing Sheets

FIGURE 1: TRANSFORM A STRING TO SATISFY A TEMPLATE

FIGURE 2: DEFINE CONTEXT

FIGURE 3: STEPS TO DETERMINE MINIMUM COST

*Figure 4*

| $D(a^i,B^j)$ | | $B_1$ | $B_2$ | ... | $B_{M-1}$ | $B_M$ |
|---|---|---|---|---|---|---|
| | 410 | | | | | |
| | 0 | $w_{ins}(B_1)$ | 450 | | | |
| $a_1$ | $w_{del}(a_1)$ | | | 430 | | |
| $a_2$ | 440 | | $D(a^i,B^j)$ | 400 | | |
| | | 460 | | | | |
| $\vdots$ | | | | | | |
| $a_{N-1}$ | | | | | | 420 |
| $a_N$ | | | | | | $D(a^N,B^M)$ |

$$D(a^i,B^j) = \min \begin{cases} D(a^{i-1},B^j) + w_{del}(a_i) \\ D(a^i,B^{j-1}) + w_{ins}(B_j) \\ D(a^{i-1},B^{j-1}) + w(a_i,B_j) \end{cases}$$

*Figure 5*

| $D(a^i,B^j)$ | | $B_1$ | ... | $B_{Lmin}$ | $B_{Lmin+1}$ | ... | $B_{Lmax}$ |
|---|---|---|---|---|---|---|---|
| | 530 | | | | | | |
| | 0 | $w_{ins}(B_1)$ | | | | | |
| $a_1$ | $w_{del}(a_1)$ | | | | | | |
| $a_2$ | | | | | | | |
| $\vdots$ | | | | 500 | 510 | | 520 |
| $a_N$ | | | | $D(a^N,B^{Lmin})$ | $D(a^N,B^{Lmin+1})$ | ... | $D(a^N,B^{Lmax})$ |

FIGURE 6: TRANSFORM A STRING TO SATISFY ONE OR MORE TEMPLATES IN A SET OF TEMPLATES

METHOD OF CORRECTING STRINGS

BACKGROUND OF INVENTION

1. Field of Invention

The present invention relates to string processing and, in particular, to automatic string correction. The preferred embodiment of the present invention relates to the processing of strings generated by Optical Character Recognition and, in particular, to the automatic correction thereof.

2. Discussion of Related Art

Optical Character Recognition (OCR) consists of recognizing a string of characters in an image and returning a corresponding string of characters (e.g. in text form). A typical OCR process comprises the steps of acquiring an image containing a string of characters, segmenting the image to isolate individual characters, recognizing each individual character as a character of an alphabet, and returning a string of characters.

OCR has a wide range of applications including the recognition of vehicle license plate numbers (for use in automated traffic law enforcement, surveillance, access control, tolling, etc.), the recognition of serial numbers on parts in an automated manufacturing environment, the recognition of labels on packages for routing purposes, and various document analysis applications.

Despite the sophistication of present OCR techniques, OCR errors frequently occur due to the non-ideal conditions of image acquisition, the partial occlusion or degradation of the depicted characters, and especially the structural similarity between certain characters (e.g. Z and 2, O and D, 1 and 1). For example, the recognition of vehicle license plate numbers must overcome lighting conditions that are both variable (according to the time of day, weather conditions, etc.) and non-uniform (e.g. due to shadows and specular reflection), perspective distortion, and partial occlusion or degradation of the characters (e.g. due to mud, wear of the paint, etc.).

To improve the overall performance of OCR systems, it is essential to include a post-processing stage, during which OCR errors are automatically detected and corrected.

A popular technique to automatically correct errors in words is "dictionary lookup": an incorrect word, that is one that does not belong to a predefined "dictionary" of valid words, is replaced by the closest valid word in the dictionary. This is often achieved by selecting the dictionary word yielding the minimum "edit distance" with the incorrect word. The edit distance between two strings is the minimum number of edit operations (deletions, insertions, and substitutions) required to transform the first string into the second string. The edit distance has been generalized by assigning a weight to an edit operation according to the type of operation and/or the character(s) of the alphabet involved in the operation.

Methods of automatic string correction based on the dictionary lookup paradigm are useful in cases where valid input strings are those belonging to a limited dictionary of valid strings. However, they are inadequate to correct strings that are not of the word-type. There are an increasing number of OCR applications in which valid strings are not words but strings satisfying a "template" of some sort; such strings include vehicle license plate numbers, serial numbers, ID numbers, ZIP codes, etc. Consequently, there is a growing need for a method to correct such strings.

SUMMARY OF INVENTION

According to one aspect of the present invention, a method is proposed to determine a set of edit operations to perform on a string to satisfy a string template. The method comprises the steps of: determining a minimum cost of performing edit operations on the string to satisfy the string template, and determining a set of edit operations corresponding to the minimum cost.

A string comprises a sequence of one or more characters $a_i$ of an alphabet. A string template comprises a sequence of one or more characters sets $B_j$, each comprising one or more characters of the alphabet. The edit operations consist of: deleting a character $a_i$ of the string, inserting a character set $B_j$ of the string template into the string, and substituting a character $a_i$ of the string by a character set $B_j$ of the string template.

According to another aspect of the present invention, a method is proposed to transform a string to satisfy one or more string templates in a set of string templates. The method comprises the following steps. First, for one or more of the string templates, a minimum cost of performing edit operations on the string to satisfy the string template is determined. Second, one or more of the string templates are selected according to the one or more minimum costs. Then, for the one or more selected templates, a set of edit operations corresponding to the respective minimum cost is determined, and the set of edit operations is performed on the string.

According to another aspect of the present invention, a method is proposed to determine a minimum cost of performing edit operations on a string to satisfy a string template. The method comprises the steps of: determining set costs of performing sets of edit operations using costs associated with edit operations of the set, and determining the minimum cost using the set costs.

In a preferred embodiment of these methods, the string is generated by an optical character recognition process.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Method to Transform a String to Satisfy a String Template

Figure 1:
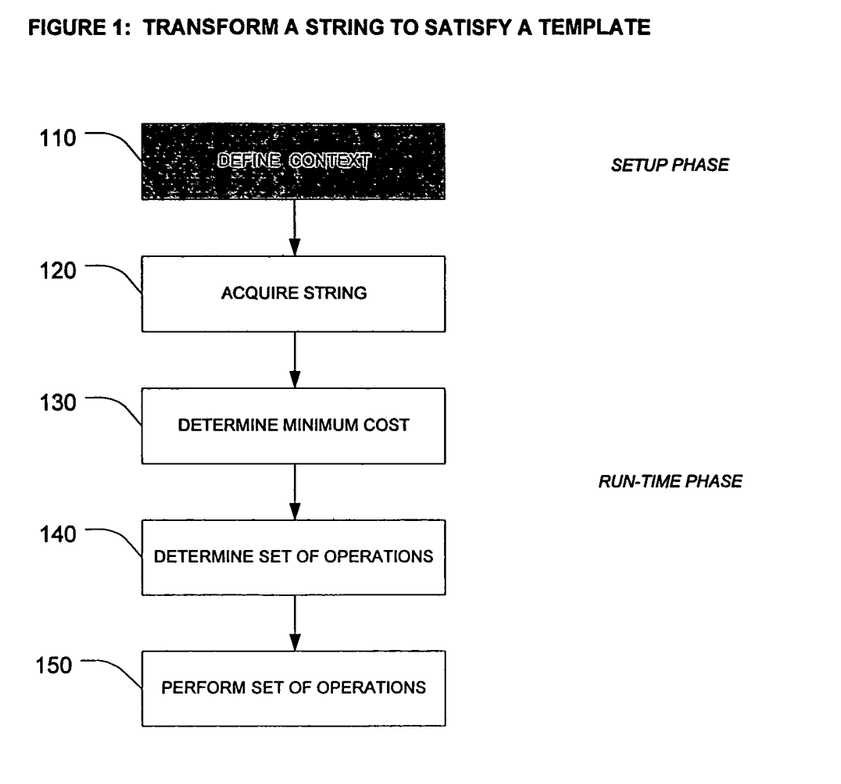
FIG. 1 is a flowchart illustrating the principal steps of transforming a string to satisfy a string template, according to an embodiment of the present invention.

FIG. 1 is a flowchart illustrating the principal steps of transforming a string to satisfy a string template, according to an embodiment of the present invention. Referring to FIG. 1, the method comprises a setup or context definition phase (step 110) and a run-time phase (steps 120-150). During the context definition phase (at step 110), a string-processing context is defined according to the steps outlined in FIG. 2; namely, referring to FIG. 2, an alphabet is defined (at step 210), a set of edit operation costs is defined (at step 220), and one or more string templates are defined (at step 230). Returning to FIG. 1, the run-time phase comprises the steps of acquiring a string (at step 120), determining a minimum cost of performing edit operations on the acquired string to satisfy a string template defined during the context definition phase (at step 130), determining a set of edit operations corresponding to the minimum cost (at step 140), and performing the set of edit operations on the string (at step 150).

Context Definition Phase

Referring again to FIG. 2, the principal steps of the context definition phase are now described in greater detail. At step 210, an alphabet is defined; the alphabet is preferably defined as the alphabet over which input strings in the context are defined. In one embodiment, the alphabet is the set of characters A-Z and numerals 0-9, although other alphabets can also be used.

Figure 2:
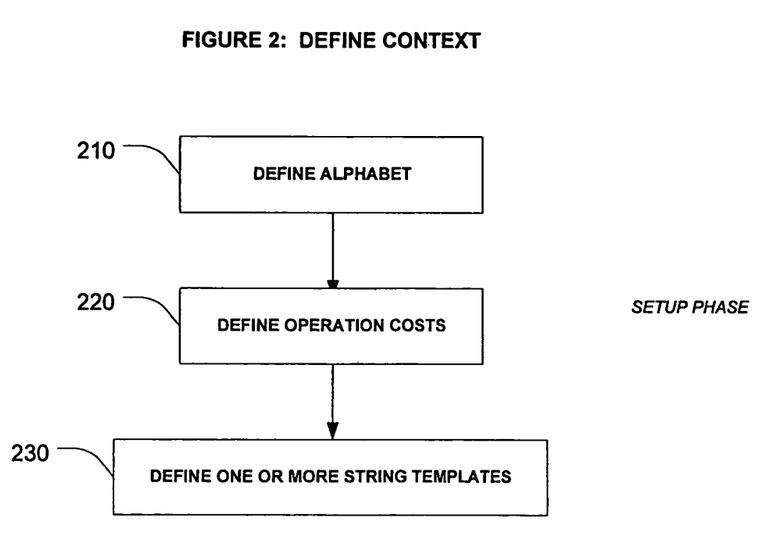
FIG. 2 is a flowchart illustrating the principal steps of the context definition phase, according to an embodiment of the present invention.

According to an embodiment of the present invention, at step 220, every character of the alphabet is assigned a deletion cost, an insertion cost, and a set of substitution costs. Specifically, a cost $w_{del}(a)$ of deleting character a, a cost $w_{ins}(b)$ of inserting character b, and a cost $w(a, b)$ of substituting character a by character b are defined for every character a and every character b of the alphabet.

According to another embodiment, at step 220, only a subset of the aforementioned operation costs are defined, according to the requirements of the run-time phase. In one embodiment, only insertion costs and substitution costs are defined at step 220. Also, one will appreciate that the operation costs required during the run-time phase depend on the character sets of the string templates defined at step 230. Therefore, according to one embodiment, the order of steps 220 and 230 is reversed, and only the operation costs that are required based on the defined string templates are defined.

At step 230, one or more string templates are defined. In an embodiment of the present invention, a string template T consists of a sequence of M character sets $B_j$:

$$T=B_1B_2\ldots B_M$$

Each character set $B_j$ consists of a subset of the alphabet. A character set can consist of a single character of the alphabet, several characters of the alphabet, or all characters of the alphabet. According to this embodiment, a string S preferably satisfies a string template T if the string and the string template are of the same length and if each character of the string belongs to the character set at the corresponding position in the string template.

In another embodiment, a string template T consists of a sequence of character sets $B_j$ of variable length. The string template may have a minimum length $L_{min}$ and a maximum length $L_{max}$, and a character set $B_j$ is defined for each position j in the string template in the range $[1, L_{max}]$:

$$T=B_1B_2\ldots B_{L\ min}\ldots B_{L\ max}$$

According to this embodiment, a string S preferably satisfies a string template T if the length of the string belongs to the range $[L_{min}, L_{max}]$ defined by the minimum and maximum lengths of the string template and if each character of the string belongs to the character set at the corresponding position in the string template. Note that the minimum length $L_{min}$ and the maximum length $L_{max}$ need not be constant values. In one embodiment, the maximum length $L_{max}$ is defined as a function of the length N of the string (acquired during the run-time phase), for example using the relation $L_{max}=N+X$ where X is a constant value.

Run-Time Phase

Referring again to FIG. 1, the steps of the run-time phase are now described in greater detail. At step 120, a string is acquired. The string may consist of a sequence of N characters $a_i$ belonging to an alphabet: $S=a_1a_2\ldots a_N$. Note that the exact length N of the string may not be known prior to acquisition of the string at step 120. Optionally, each character $a_i$ of the string has an associated attribute $s_i$; in this case, both a string and a corresponding set of attributes are acquired at step 120. At step 130, a minimum cost of performing edit operations on the acquired string to satisfy a string template defined during the context definition phase is determined.

Determine Minimum Cost

Figure 3:
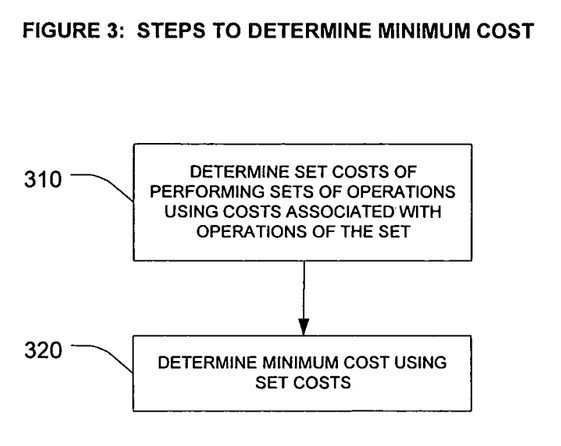
FIG. 3 is a flowchart illustrating the principal steps of determining a minimum cost of performing edit operations on a string to satisfy a string template, according to the present invention.

FIG. 3 is a flowchart illustrating the principal steps of determining a minimum cost of performing edit operations on a string to satisfy a string template according to the present invention. Referring to FIG. 3, the method comprises the steps of determining set costs of performing sets of edit operations using costs associated with edit operations of the set (at step 310) and determining the minimum cost using the set costs (at step 320).

First, the process of determining the cost associated with an edit operation is described. As mentioned previously, the edit operations preferably consist of: deleting a character $a_i$ of the string, inserting a character set $B_j$ of the string template into the string, and substituting a character $a_i$ of the string by a character set $B_j$ of the string template. Accordingly, the costs associated with the edit operations are the cost $w_{del}'(a_i)$ associated with deleting character $a_i$ of the string, the cost $w_{ins}(B_j)$ associated with inserting character set $B_j$ of the string template into the string, and the cost $w(a_i, B_j)$ associated with substituting character $a_i$ of the string by character set $B_j$ of the string template.

According to one embodiment, the cost associated with an edit operation is determined using the cost assigned to a character of the alphabet (e.g. during the context definition phase). Furthermore, the cost associated with an edit operation involving a character set of the string template is determined using the assigned cost of a character of the character set.

In the aforementioned embodiment in which, during the context definition phase, every character of the alphabet is assigned a deletion cost, an insertion cost, and a set of substitution costs, the associated costs are determined as follows. The cost $w_{del}'(a_i)$ is determined using the assigned deletion cost $w_{del}(a_i)$. The cost $w_{ins}(B_j)$ is determined using the assigned insertion cost $w_{ins}(b_k)$ of a character $b_k$ of character set $B_j$. The cost $w(a_i, B_j)$ is determined using the assigned substitution cost $w(a_i, b_k)$ of a character $b_k$ of character set $B_j$.

In a preferred embodiment, the cost $w_{ins}(B_j)$ is determined using the lowest insertion cost among the insertion costs $w_{ins}(b_k)$ of the characters $b_k$ of character set $B_j$, for example, using $$w_{ins}(B_j) = \min_{\forall b_k \in B_j} \{w_{ins}(b_k)\}.$$

Similarly, the cost $w(a_i, B_j)$ is determined using the lowest substitution cost among the substitution costs $w(a_i, b_k)$ of the characters $b_k$ of character set $B_j$, for example, using $$w(a_i, B_j) = \min_{\forall b_k \in B_j} \{w(a_i, b_k)\}.$$

According to one embodiment, each character $a_i$ of the character string $S=a_1a_2 \ldots a_N$ has an associated attribute $s_i$ (acquired with the string at step 120 of FIG. 1, as described previously), and the cost associated with an edit operation involving a character $a_i$ of the string is determined using the attribute $s_i$. Namely, at least one of the costs $w_{del}'(a_i)$ and $w(a_i, B_j)$ is determined using the attribute $s_i$ of character $a_i$.

In the aforementioned embodiment in which every character of the alphabet is assigned a deletion cost, an insertion cost, and a set of substitution costs, the costs $w_{del}'(a_i)$ and $w(a_i, B_j)$ are optionally determined using the attribute $s_i$ of character $a_i$ in addition to the assigned costs $w_{del}(a_i)$ and $w(a_i, b_k)$.

In the aforementioned embodiment in which only insertion costs and substitution costs are defined during the context definition phase, the associated costs are preferably determined as follows. The cost $w_{del}'(a_i)$ is determined using the attribute $s_i$ of character $a_i$ (using, for example, $w_{del}'(a_i)=s_i$); the cost $w_{ins}(B_j)$ is determined using the assigned insertion cost $w_{ins}(b_k)$ of a character $b_k$ of character set $B_j$; and the cost $w(a_i, B_j)$ is determined using the assigned substitution cost $w(a_i, b_k)$ of a character $b_k$ of character set $B_j$ and, optionally, the attribute $s_i$ of character $a_i$.

In the aforementioned embodiment comprising a string template $T=B_1B_2 \ldots B_M$ of fixed length, the steps of determining set costs 310 and of determining the minimum cost using the set costs 320 can be performed according to any suitable method used to determine the edit distance between two strings.

In a preferred embodiment, the minimum cost $D(S,T)$ of performing edit operations on a string $S=a_1a_2 \ldots a_N$ to satisfy a string template $T=B_1B_2 \ldots B_M$ is performed as follows. Let $a^i$ denote the substring formed by the first i characters of the string S, and let $B_j$ denote the "sub-template" formed by the first j character sets of the string template T:

$$a^i = \begin{cases} a_1a_2 \ldots a_i & i \geq 1 \\ \phi & i = 0 \end{cases}$$

$$B^j = \begin{cases} B_1B_2 \ldots B_j & j \geq 1 \\ \phi & j = 0 \end{cases}$$

The minimum cost $D(S,T)=D(a^N, B^M)$ is determined using the base conditions $$D(a^0, B^0) = 0$$

$$D(a^i, B^0) = \sum_{x=1}^{i} w_{del}'(a_x)$$

$$D(a^0, B^j) = \sum_{x=1}^{j} w_{ins}(B_x)$$

and the recurrence relation:

$$D(a^i, B^j) = \min \begin{cases} D(a^{i-1}, B^j) + w_{del}'(a_i) \\ D(a^i, B^{j-1}) + w_{ins}(B_j) \\ D(a^{i-1}, B^{j-1}) + \delta(a_i, B_j) \cdot w(a_i, B_j) \end{cases}$$

where:
- $w_{del}'(a_i)$ is the cost associated with deleting character $a_i$ of the string,
- $w_{ins}(B_j)$ is the cost associated with inserting character set $B_j$ of the string template into the string,
- $w(a_i, B_j)$ is the cost associated with substituting character $a_i$ of the string by character set $B_j$ of the string template, and
- $\delta(a_i, B_j)$ is a variable equal to 0 if character $a_i$ belongs to character set $B_j$ and equal to 1 otherwise.

For each determination of a $D(a^i, B^j)$ value, the costs $w_{del}'(a_i)$, $w_{ins}(B_j)$, and $w(a_i, B_j)$ required in the computation are determined according to the process described previously.

Figure 4:
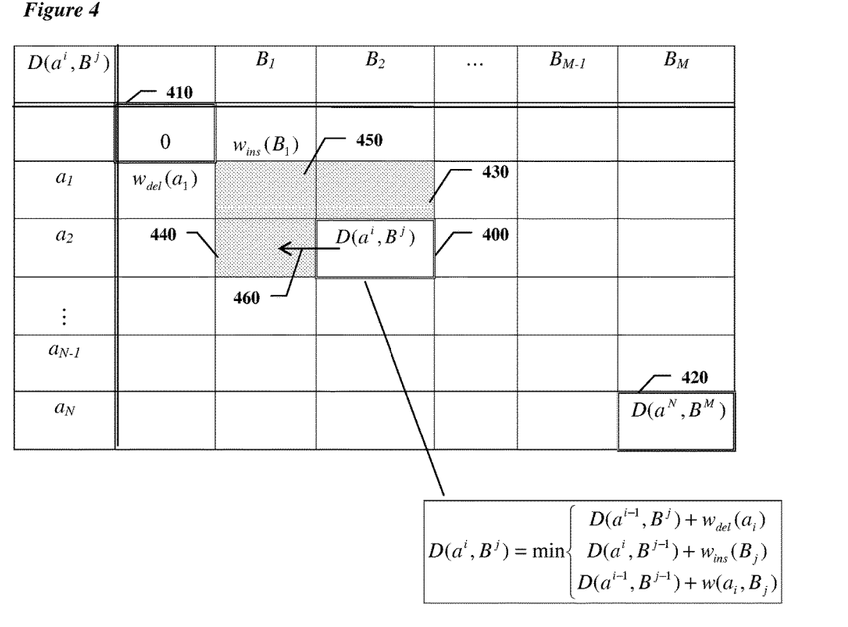
FIG. 4 illustrates a dynamic programming array used in determining a minimum cost of performing edit operations on a string to satisfy a string template of fixed length, according to an embodiment of the present invention.

Furthermore, the minimum cost is preferably determined using a dynamic programming algorithm (DPA). According to a DPA approach, the minimum cost $D(S,T)=D(a^N, B^M)$ is determined by determining $D(a^i, B^j)$ for increasing values of i and j in the ranges [0, N] and [0, M] respectively; the $D(a^i, B^j)$ values are recorded in a dynamic programming array for use in determining dependent $D(a^i, B^j)$ values. FIG. 4 illustrates a dynamic programming array. The array contains N+1 by M+1 cells; each cell (i, j) 400 contains a corresponding value $D(a^i, B^j)$. The table is filled in starting with the upper-left cell (0,0) 410 and moving toward the lower-right cell (N, M) 420. The value in the upper-left cell (0,0) 410 is the base condition $D(a^0, B^0)=0$. The value in each other cell (i, j) 400 is calculated from the values in the three predecessor cells (i−1, j) 430, (i, j−1) 440, and (i−1, j−1) 450 and the costs associated with the edit operations, using the aforementioned recurrence relation. The value in the lower-right cell (N, M) 420 is the minimum cost $D(S,T)$ of performing edit operations on the string to satisfy the string template.

In the aforementioned embodiment comprising a string template $T=B_1B_2 \ldots B_{L\ min} \ldots B_{L\ max}$ of variable length, the method of determining a minimum cost (as outlined in FIG. 3) comprises additional steps. Firstly, a template version $T(L)=B_1B_2 \ldots B_L$ is associated with each length L in the range $[L_{min}, L_{max}]$ defined by the minimum and maximum lengths of the string template. Secondly, for each of the template versions, a minimum cost of performing edit operations on the string to satisfy the template version is determined. Finally, the lowest minimum cost is selected among the minimum costs of the template versions.

Figure 5:
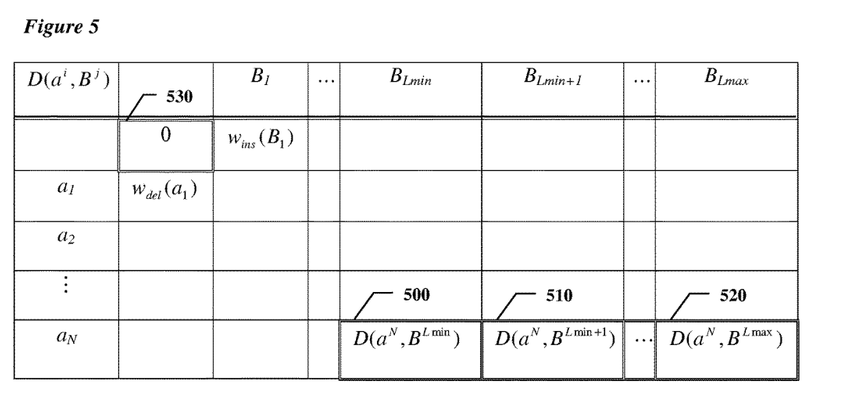
FIG. 5 illustrates a dynamic programming array used in determining a minimum cost of performing edit operations on a string to satisfy a string template of variable length, according to an embodiment of the present invention.

In a preferred embodiment, these steps are performed using an extension of the aforementioned DPA approach. For a string template $T=B_1B_2 \ldots B_{L\ min} \ldots B_{L\ max}$, a dynamic programming array is constructed containing $N+1$ by $L_{max}+1$ cells, as illustrated in FIG. 5. The array is filled in completely using the aforementioned recurrence relation, as though determining the minimum cost between the string and the longest template version $T(L_{max})$. The lower-right cells $(N, L_{min})$ 500, $(N, L_{min}+1)$ 510, ..., and $(N, L_{max})$ 520 contain the minimum costs of performing edit operations on the string to satisfy each of the template versions $T(L_{min})$, $T(L_{min}+1)$, ..., and $T(L_{max})$, respectively. The "overall" minimum cost $D(S,T)$ of performing edit operations on the string to satisfy the string template of variable length is obtained by selecting the lowest minimum cost among the minimum costs of the template versions contained in these lower-right cells 500, 510, and 520.

Determine Set of Operations

Referring again to FIG. 1, the step 140 of determining a set of edit operations corresponding to the minimum cost is now described.

In a preferred embodiment, step 140 is performed in two consecutive steps. In a first step, a set of edit operations corresponding to the minimum cost is determined in terms of characters $a_i$ of the string and character sets $B_j$ of the string template. In a second step, each edit operation (of the set of edit operations determined in the first step) involving a character set $B_j$ of the string template is determined in terms of a specific character $b_k$ of the character set $B_j$. In another embodiment, these steps are performed simultaneously.

The set of edit operations may be determined in terms of the following edit operations: deleting a character $a_i$ of the string, inserting a character set $B_j$ of the string template into the string, and substituting a character $a_i$ of the string by a character set $B_j$ of the string template.

In the case of a string template $T=B_1B_2 \ldots B_M$ of fixed length, the first step can be performed according to any suitable method used to determine a set of edit operations corresponding to the edit distance between two strings (i.e. an optimal edit transcript).

In a preferred embodiment, step 130 of determining a minimum cost is performed according to a dynamic programming algorithm, and step 140 of determining a set of edit operations corresponding to the minimum cost comprises backtracking through a dynamic programming array. Preferably, a set of pointers are recorded (at step 130) while determining the minimum cost according to a dynamic programming algorithm, and these pointers are retrieved (at step 140) to determine a set of edit operations corresponding to the minimum cost, according to a method known to those skilled in the art. Referring to FIG. 4, at each computation of $D(a^i, B^j)$ (in cell 400) using the aforementioned recurrence relation, a pointer records which of the three predecessor cells $(i-1, j)$ 430, $(i, j-1)$ 440, and $(i-1, j-1)$ 450 yielded the minimum value; symbolically, an arrow 460 points from each cell $(i, j)$ to the relevant predecessor cell (e.g. 440). A set of edit operations is determined (at step 140) by following any path indicated by these arrows from the lower-right cell $(N, M)$ 420 to the upper-left cell $(0,0)$ 410.

In the case of a string template $T=B_1B_2 \ldots B_{L\ min} \ldots B_{L\ max}$ of variable length, the first step is performed as follows. A minimum cost is determined (at step 130) by selecting the lowest minimum cost among the minimum costs of the template versions, and a set of edit operations corresponding to the minimum cost is determined (at step 140) by determining a set of edit operations corresponding to this lowest minimum cost.

In a preferred embodiment, the minimum cost is determined (at step 130) using the aforementioned extension of the DPA approach (described with reference to FIG. 5), and a set of edit operations corresponding to the lowest minimum cost is determined (at step 140) by backtracking through a dynamic programming table. Preferably, a set of pointers are recorded (at step 130), and these pointers are retrieved (at step 140) to determine a set of edit operations corresponding to the lowest minimum cost. Referring to FIG. 5, a set of edit operations corresponding to the lowest minimum cost is determined by following any path indicated by the arrows from cell $(N, L_{mincost})$ to cell $(0,0)$ 530, where the cell $(N, L_{mincost})$ is the cell containing the lowest minimum cost among the minimum costs of the template versions (contained in the lower-right cells 500, 510, and 520).

In a second step, for the set of edit operations determined in the first step, each edit operation involving a character set $B_j$ of the string template is determined in terms of a specific character $b_k$ of the character set $B_j$.

In one embodiment, each edit operation involving a character set $B_j$ is replaced by an edit operation involving the character $b_k$ of the character set $B_j$ having the lowest assigned cost for the edit operation. Thus, the insertion of a character set $B_j$ is replaced with the insertion of the character $b_k$ having the lowest insertion cost $w_{ins}(b_k)$ among the characters $b_k$ of character set $B_j$. Similarly, the substitution of a character $a_i$ by a character set $B_j$ is replaced with the substitution of character $a_i$ by the character $b_k$ having the lowest substitution cost $w(a_i, b_k)$ among the characters $b_k$ of character set $B_j$.

Perform Set of Operations

Referring to FIG. 1, in a final step 150, the set of edit operations is performed on the string.

Optical Character Recognition

In a preferred embodiment, the method of transforming a string to satisfy a string template is used to transform a string generated by an Optical Character Recognition process (hereafter, an OCR string) to satisfy a string template. The method of transforming an OCR string may be performed according to the general steps described previously with reference to FIGS. 1, 2 and 3.

Referring to FIG. 1, at step 110, an OCR string-processing context is defined according to the steps of FIG. 2. Referring to FIG. 2, at step 210, an alphabet is defined. An OCR process, receiving as input a target character contained in an image, returns a character from a set of output characters. Therefore, the alphabet is preferably defined (at step 210) according to the set of output characters of the OCR process generating the strings.

At step 220, a set of edit operation costs is defined. In a preferred embodiment, only insertion costs and substitution costs are defined at step 220. The insertion costs $w_{ins}(b)$ may be appropriate constant values and the substitution costs $w(a, b)$ may be defined according to similarity scores associated with the OCR process.

In a typical OCR process, each output character has a corresponding model character. During the OCR process, a similarity score is computed between a target character and each of the model characters, in turn; the model character corresponding to the best similarity score is selected as a match for the target character; and the corresponding output character is returned. In a preferred embodiment, the cost $w(a, b)$ of substituting character a by character b is made a function of a similarity score S(a, b) between the model characters corresponding to a and b associated with the OCR process. In a preferred embodiment, the similarity score used to determine the substitution cost w(a, b) is the same similarity score as is determined between the target character and each of the model characters during the OCR process. The similarity score can be any measure of the similarity between two characters (or objects more generally) known to those skilled in the art. For example, a similarity score between two objects can be determined by first extracting a set of features from each of the objects to obtain two feature vectors and then computing a similarity score between the two vectors (e.g. using a Euclidean distance). In a preferred embodiment, the similarity score S(a, b) is in the range [0,1], where '0' is the lowest level of similarity and '1' is the highest level of similarity, and the substitution cost w(a, b) is related to the similarity score according to the relation: w(a, b)=1−S(a, b). In a preferred embodiment, the insertion cost $w_{ins}(b)$ is a constant value in the range [0,1].

In another embodiment, deletion costs $w_{del}(a)$, insertion costs $w_{ins}(b)$ and substitution costs w(a, b) are defined (at step 220) according to error statistics associated with the OCR process. In one such embodiment, the OCR process is applied to a large set of target characters, and the number of deletions, insertions, substitutions, and correct matches by the OCR process are recorded and then used to determine the operation costs.

Returning to FIG. 2, at step 230, one or more string templates are defined. As described previously, the string template can be of fixed length or of variable length.

Returning to FIG. 1, during the run-time phase, an OCR string is acquired (at step 120). In a preferred embodiment, both an OCR string and a corresponding set of attributes are acquired at step 120. In the OCR framework, the attribute $s_i$ of a character $a_i$ of the string is a confidence attribute associated with the OCR process. When an OCR process returns an output character for a target character, it can assign a confidence score to the output character; the confidence score is a measure of the likelihood that the target character was matched correctly. The confidence attribute acquired at step 120 can be any measure of confidence known to those skilled in the art. Preferably, the confidence attribute s of an output character a is a similarity score determined between the target character and the model character associated with character a. Alternatively, it can be a function (e.g. difference, ratio, etc.) of the best similarity score (namely that associated with character a) and the second-best similarity score, for instance.

At step 130, a minimum cost of performing edit operations on the acquired OCR string to satisfy a string template defined during the context definition phase is determined, according to the steps described previously with reference to FIG. 3.

The process of determining the cost associated with an edit operation in the OCR framework is now described. In the aforementioned preferred embodiment in which the insertion and substitution costs are defined (during the context definition phase) using constant values and similarity scores respectively, the associated costs are determined as follows. The cost $w_{del}'(a_i)$ is determined using the confidence attribute $s_i$ of character $a_i$; the cost $w_{ins}'(B_j)$ is determined using the assigned insertion cost $w_{ins}(b_k)$ of a character $b_k$ of character set $B_j$; and the cost $w(a_i, B_j)$ is determined using the assigned substitution cost $w(a_i, b_k)$ of a character $b_k$ of character set $B_j$ and, optionally, the confidence attribute $s_i$ of character $a_i$.

In the aforementioned embodiment in which deletion, insertion, and substitution costs are defined (during the context definition phase) using error statistics, the associated costs are determined using the assigned costs and, optionally, the confidence attributes, according to the method described previously for the general case.

The remaining steps of determining a minimum cost (at step 130) are performed as described previously for the general case.

At step 140, a set of edit operations corresponding to the minimum cost is determined. As described previously for the general case, step 140 is preferably performed in two consecutive steps. In a first step, a set of edit operations corresponding to the minimum cost is determined in terms of characters $a_i$ of the string and character sets $B_j$ of the string template. In the OCR framework, this first step is performed as described previously for the general case. In a second step, each edit operation (of the set of edit operations determined in the first step) involving a character set $B_j$ of the string template is determined in terms of a specific character $b_k$ of the character set $B_j$. In the OCR framework, this second step can be performed according to different methods.

In a first embodiment, the second step is performed as described previously for the general case. Namely, each edit operation involving a character set $B_j$ is replaced by an edit operation involving the character $b_k$ of the character set $B_j$ having the lowest assigned cost for the edit operation.

In a preferred embodiment, the second step is performed according to the following method. As described previously, an OCR process, receiving as input a target character contained in an image, returns a character from a set of output characters. Typically, each output character has a corresponding model character. During the OCR process, a similarity score is computed between a target character and each of the model characters, in turn; the model character yielding the best similarity score is selected as a match for the target character; and the corresponding output character is returned. Thus, a character $a_i$ of the OCR string was generated because the model character associated with character $a_i$ yielded the best similarity score among the set of model characters. In a preferred embodiment, a character $a_i$ of the OCR string is substituted by a character $b_k$ of character set $B_j$ as follows. First, for each character $b_k$ of character set $B_j$, the similarity score determined between the target character (initially matched to character $a_i$) and the model character associated with character $b_k$ is acquired. Then, the character $b_k$ having the highest similarity score is selected for the substitution. In other words, the OCR process of selecting the best similarity score among the similarity scores of the model characters is repeated considering only those model characters belonging to the character set. In a preferred embodiment, a character $b_k$ of character set $B_j$ is inserted into the OCR string as follows. First, the target characters associated with the characters of the OCR string between which a character set is to be inserted are identified in the image, and a new target character is considered in the portion of the image between these target characters. Then, for each character $b_k$ of character set $B_j$, a similarity score is determined between the new target character and the model character associated with character $b_k$. Finally, the character $b_k$ having the highest similarity score is selected for the insertion.

Referring to FIG. 1, in a final step 150, the set of edit operations is performed on the acquired OCR string.

The proposed method of transforming an OCR string to satisfy a string template can advantageously be applied to the automatic correction of a variety of types of strings generated by OCR and that are expected to satisfy a given format, such as vehicle license plate numbers, serial numbers, ID numbers, ZIP codes, etc. For example, if an OCR process used to recognize vehicle license plate numbers outputs an invalid character string 1Z3ABC1, the proposed method can be used to correct the invalid string to satisfy the string template DDDLLL (3 digits followed by 3 letters) representing a known license plate format.

Although the present invention is preferably used to transform a string generated by an OCR process, the method can also be applied to transform a string of characters generated by another process, such as another recognition process (e.g. voice recognition) or by a user typing on a keyboard. This can be achieved by defining a set of edit operation costs reflective of the types of errors associated with that input method (e.g. phonetic similarity between characters, proximity of characters on keyboard, etc.).

Method to Transform a String to Satisfy One or More String Templates in a Set of String Templates According to another aspect of the present invention, a method is proposed to transform a string to satisfy one or more string templates in a set of string templates.

Figure 6:
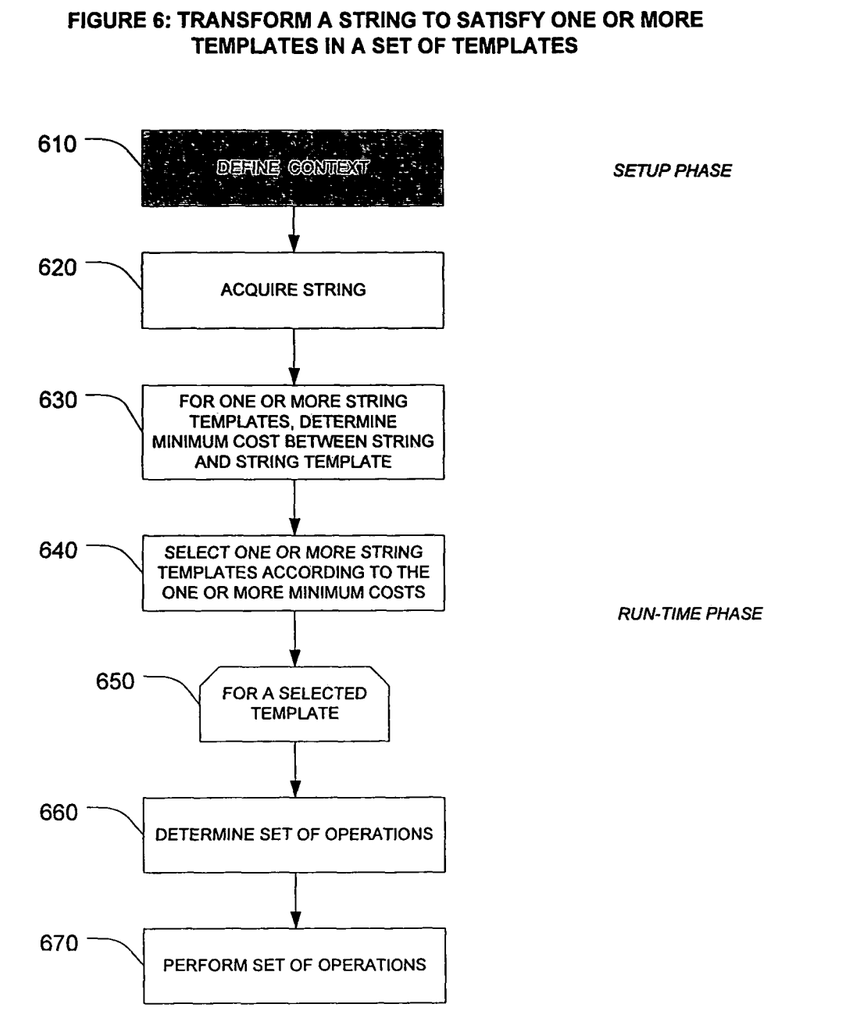
FIG. 6 is a flowchart illustrating the principal steps of transforming a string to satisfy one or more string templates in a set of string templates, according to an embodiment of the present invention.

FIG. 6 is a flowchart illustrating the principal steps of transforming a string to satisfy one or more string templates in a set of string templates, according to an embodiment of the present invention. The method comprises a setup or context definition phase (step 610) and a run-time phase (steps 620-670). The context definition phase comprises the steps illustrated in FIG. 2; referring to FIG. 2, this time, multiple string templates are defined at step 230. Returning to FIG. 6, the run-time phase comprises the following steps. At step 620, a string is acquired. At step 630, for one or more of the string templates defined during the context definition phase, a minimum cost of performing edit operations on the acquired string to satisfy the string template is determined. At step 640, one or more of the string templates are selected according to the one or more minimum costs. At step 650, for the one or more selected templates, a set of edit operations corresponding to the respective minimum cost is determined (at step 660) and the set of edit operations is performed on the acquired string (at step 670).

In an embodiment of the present invention, steps 630-670 are performed as follows. At step 630, for each of the string templates defined during the context definition phase, a minimum cost of performing edit operations on the string to satisfy the string template is determined. At step 640, a predetermined number k of the string templates is selected; the k selected string templates are those having the lowest minimum costs. At step 650, for each of the k selected templates, a set of edit operations corresponding to the respective minimum cost is determined (at step 660) and the set of edit operations is performed on the acquired string (at step 670).

In a preferred embodiment of the present invention, the predetermined number k is equal to 1: the string template having the lowest minimum cost is selected (at step 640). Accordingly, for this string template (at step 650), a set of edit operations corresponding to the lowest minimum cost is determined (at step 660) and the set of edit operations is performed on the acquired string (at step 670).

Optionally, a "stop condition" can be introduced to the preferred embodiment as follows. If, during step 630 of determining a minimum cost between the acquired string and each of the string templates, a string template is found having a minimum cost below a predetermined threshold, step 630 is terminated. This string template is then selected (at step 640), and the acquired string is transformed to satisfy this string template according to steps 660 and 670.

In an alternative embodiment of the present invention, steps 630 and 640 are performed as follows. At step 630, for each of the string templates defined during the context definition phase, a minimum cost of performing edit operations on the string to satisfy the string template is determined. At step 640, each of the string templates having a minimum cost below a predetermined threshold is selected. In yet another embodiment, steps 630 and 640 are performed as follows. At step 630, a minimum cost is determined between the acquired string and a string template. At step 640, if the determined minimum cost is below a predetermined threshold, the string template is selected; otherwise, steps 630 and 640 are repeated with another string template. The process ends when a string template is selected or when there are no more string templates to process. In both of these embodiments, steps 660 and 670 are then performed for each of the selected templates.

The steps illustrated in FIG. 6 that have not been described with reference thereto can be performed according to any of the various embodiments described previously with reference to analogous steps of FIG. 1.

These steps are briefly summarized. The context definition phase (step 610) is performed according to the steps outlined in and previously described with reference to FIG. 2. Referring to FIG. 2, at step 220, edit operation costs can be defined for all characters and operations or only a subset thereof according to the requirements of the run-time phase; at step 230, the defined string templates can be of fixed or variable length. At step 620, a string and, optionally, a corresponding set of attributes are acquired. At step 630, a minimum cost is determined between the acquired string and a string template of the set of string templates according to the steps previously described with reference to FIG. 1, step 130 and FIG. 3. The costs associated with the edit operations can be determined according to any of the aforementioned embodiments (for example, using confidence scores or not). For a string template of fixed length, the minimum cost is preferably determined according to a dynamic programming algorithm. For a string template of variable length, additional steps are required as described previously; again, the minimum cost is preferably determined using an extension of the DPA approach. At step 660, a set of edit operations corresponding to a minimum cost is determined as described previously with reference to FIG. 1, step 140 (namely, preferably in two consecutive steps and, again, according to whether the string template is of fixed or variable length).

Optical Character Recognition

In a preferred embodiment, the method of transforming a string to satisfy one or more string templates in a set of string templates is used to transform a string generated by an Optical Character Recognition process to satisfy one or more string templates in a set of string templates. In a preferred embodiment, this method of transforming an OCR string is performed according to the general steps described with reference to FIGS. 6, 2 and 3; in addition, steps which are specific to the OCR framework can be performed according to any of the embodiments described previously with reference to a method to transform an OCR string to satisfy a string template.

Referring to FIG. 6, the preferred embodiment is briefly summarized. During the context definition phase (step 610), insertion and substitution costs are defined using constant values and similarity scores, respectively. During the run-time phase, both an OCR string and a corresponding set of confidence attributes are acquired (at step 620). At step 630, the cost $w_{del}'(a_i)$ is determined using the confidence attribute $s_i$ of character $a_i$; the cost $w_{ins}'(B_j)$ is determined using the assigned insertion cost $w_{ins}(b_k)$ of a character $b_k$ of character set $B_j$; and the cost $w(a_i, B_j)$ is determined using the assigned substitution cost $w(a_i, b_k)$ of a character $b_k$ of character set $B_j$ and, optionally, the confidence attribute $s_i$ of character $a_i$. At step 660, a set of edit operations corresponding to the minimum cost is determined in two consecutive steps. During the second step, a character $a_i$ of the OCR string is substituted by a character $b_k$ of character set $B_j$ as follows. First, for each character $b_k$ of character set $B_j$, the similarity score determined between the target character (initially matched to character $a_i$) and the model character associated with character $b_k$ is acquired. Then, the character $b_k$ having the highest similarity score is selected for the substitution. Also, during the second step, a character $b_k$ of character set $B_j$ is inserted into the OCR string as follows. First, the target characters associated with the characters of the OCR string between which a character set is to be inserted are identified in the image, and a new target character is considered in the portion of the image between these target characters. Then, for each character $b_k$ of character set $B_j$, a similarity score is determined between the new target character and the model character associated with character $b_k$. Finally, the character $b_k$ having the highest similarity score is selected for the insertion.

The proposed method of transforming an OCR string to satisfy one or more string templates in a set of string templates can advantageously be applied to the automatic correction of a variety of types of strings generated by OCR and that are expected to satisfy one in a set of given formats, such as vehicle license plate numbers, serial numbers, ID numbers, ZIP codes, etc. Again, if an OCR process used to recognize vehicle license plate numbers outputs an invalid character string 1Z3ABC1, the proposed method can be used to correct the invalid string to satisfy one of the string templates DDDLLL, DDLLDD, or LLDDLL representing different license plate formats.

Method to Determine a Set of Edit Operations

According to another aspect of the present invention, a method is proposed to determine a set of edit operations to perform on a string to satisfy a string template. The method comprises the steps of: determining a minimum cost of performing edit operations on the string to satisfy the string template, and determining a set of edit operations corresponding to the minimum cost. In its preferred embodiments, this method is used in a method of transforming a string to satisfy a string template (as described with reference to FIG. 1) or in a method of transforming a string to satisfy one or more string templates in a set of string templates (as described with reference to FIG. 6). However, other embodiments and applications of this method exist.

Method to Determine a Minimum Cost

According to another aspect of the present invention, a method is proposed to determine a minimum cost of performing edit operations on a string to satisfy a string template. The method comprises the steps of: determining set costs of performing sets of edit operations using costs associated with edit operations of the set, and determining the minimum cost using the set costs.

This method can be used as a first step in a method of determining a set of edit operations to perform on a string to satisfy a string template, as just described.

The minimum cost of performing edit operations on a string to satisfy a string template is also a measure of the extent to which the string satisfies the string template, and it can therefore be used in any application requiring such a measure. The minimum cost can be used to determine the best match (or matches) for a given string in a set of string templates (as in one embodiment described with reference to FIG. 6) or, conversely, to determine the best match for a given string template in a set of strings. The minimum cost can also be used to determine whether there is an approximate match between a string and a string template by comparing the determined minimum cost to a predetermined match threshold to obtain a result indicative of an approximate match. This approximate match condition can, in turn, be used in various ways. For example, it can be used to determine in a set of string templates all approximate matches for a given string (as in one embodiment described with reference to FIG. 6) or, conversely, to determine in a set of strings all approximate matches for a given string template. The latter can be applied to locating, in a list of license plate numbers generated by an error-prone OCR process, all approximate matches for a given license plate format, for example.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of automatically transforming a string comprising the steps of:

obtaining a first string from an object by an optical character recognition process, the first string comprising a sequence of characters of an alphabet;

providing, by a processor, a string template for a corrected string comprising a sequence of sets of characters, each comprising one or more characters of the alphabet representing a set of allowable characters for the respective character position in the corrected string, wherein at least one of the sets of characters of the string template comprises a plurality of characters of the alphabet;

determining, by the processor, a minimum cost of performing edit operations on the first string to satisfy the string template, the step of determining a minimum cost comprising determining whether a character of the first string belongs to a set of characters of the string template;

determining, by the processor, a set of edit operations corresponding to the minimum cost; and performing, by the processor, the set of edit operations on the first string to transform the first string into a second string that satisfies the string template.

2. The method as claimed in claim 1, wherein said step of determining a minimum cost of performing edit operations on the first string to satisfy the string template comprises the steps of:

determining set costs of performing sets of edit operations using costs associated with edit operations of the set, and determining the minimum cost using the set costs.

3. The method as claimed in claim 2, wherein said step of determining a set of edit operations corresponding to the minimum cost comprises determining a set of edit operations in terms of characters of the first string and sets of characters of the string template.

4. The method as claimed in claim 3, wherein said step of determining a set of edit operations corresponding to the minimum cost further comprises determining each edit operation involving a set of characters of the string template in terms of a character of the set of characters.

5. The method as claimed in claim 2, wherein said step of determining a minimum cost of performing edit operations on the first string to satisfy the string template is performed according to a dynamic programming algorithm, and wherein said step of determining a set of edit operations corresponding to the minimum cost comprises backtracking through a dynamic programming array.

6. The method as claimed in claim 2, wherein the string template is of variable length and has a minimum length and a maximum length.

7. The method as claimed in claim 6, wherein the step of determining a minimum cost of performing edit operations on the first string to satisfy the string template further comprises the steps of:
associating a template version with each length in a range defined by the minimum and maximum lengths,
determining a minimum cost of performing edit operations on the first string to satisfy each of the template versions, and
selecting the lowest minimum cost among the minimum costs of the template versions,
and wherein the step of determining a set of edit operations corresponding to the minimum cost comprises determining a set of edit operations corresponding to said lowest minimum cost.

8. A method of automatically transforming a string comprising the steps of:
obtaining a first string from an object by an optical character recognition process, the first string comprising a sequence of characters of an alphabet;
providing, by a processor, one or more string templates, each for a corrected string, each string template comprising a sequence of sets of characters, each comprising one or more characters of the alphabet representing a set of allowable characters for the respective character position in the corrected string, wherein at least one of the sets of characters of the string template comprises a plurality of characters of the alphabet;
for one or more of the string templates, determining, by the processor, a minimum cost of performing edit operations on the first string to satisfy the string template, the step of determining a minimum cost comprising determining whether a character of the first string belongs to a set of characters of the string template;
selecting, by the processor, one or more of the string templates according to the one or more minimum costs; and
for the one or more selected templates, determining, by the processor, a set of edit operations corresponding to the respective minimum cost, and
performing, by the processor, the set of edit operations on the first string to transform the first string into a second string that satisfies the respective string template.

9. The method as claimed in claim 8, wherein said step of for one or more of the string templates, determining a minimum cost of performing edit operations on the first string to satisfy the string template comprises for each of the string templates, determining a minimum cost of performing edit operations on the first string to satisfy the string template, and wherein said step of selecting one or more string templates according to the one or more minimum costs comprises selecting a predetermined number of string templates having the lowest minimum costs.

10. The method as claimed in claim 8, wherein said step of determining a minimum cost of performing edit operations on the first string to satisfy the string template comprises the steps of:
determining set costs of performing sets of edit operations using costs associated with edit operations of the set, and
determining the minimum cost using the set costs.

11. The method as claimed in claim 10, further comprising the steps of assigning at least one character of the alphabet a cost for an edit operation, and determining the cost associated with the edit operation using the at least one assigned cost.

12. The method as claimed in claim 11, further comprising the step of determining the cost associated with the edit operation involving a set of characters of the string template using the assigned cost of a character of the set of characters.

13. The method as claimed in claim 11, wherein a character of the first string has an attribute, and wherein the method further comprises determining the cost associated with the edit operation involving a character of the first string using the attribute thereof.

14. The method as claimed in claim 10, wherein the edit operations consist of:
deleting a character of the first string,
inserting a set of characters of the string template into the first string, and
substituting a character of the first string by a set of characters of the string template.

15. The method as claimed in claim 14, further comprising the steps of:
assigning at least one character of the alphabet an insertion cost that determines the cost of inserting the character into the first string, and
assigning at least one of the pairs of characters of the alphabet a substitution cost that determines the cost of substituting the two characters.

16. The method as claimed in claim 15, wherein a character of the first string has an attribute, and wherein the method further comprises determining the cost associated with an edit operation involving a character of the first string using the attribute thereof.

17. The method as claimed in claim 14, wherein the method is performed according to a dynamic programming algorithm.

18. The method as claimed in claim 14, wherein the string template is of variable length and has a minimum length and a maximum length.

19. The method as claimed in claim 18, further comprising the steps of:
associating a template version with each length in a range defined by the minimum and maximum lengths,
determining a minimum cost of performing edit operations on the first string to satisfy each of the template versions, and
selecting the lowest minimum cost among the minimum costs of the template versions.

20. The method as claimed in claim 19, wherein the step of determining a minimum cost of performing edit operations on the first string to satisfy each of the template versions is performed according to a dynamic programming algorithm.

21. The method as claimed in claim 18, wherein at least one of the minimum length and the maximum length of the string template is a function of the length of the first string.

22. The method as claimed in claim 8, wherein the edit operations consist of:

deleting a character of the first string, inserting a set of characters of the string template into the first string, and substituting a character of the first string by a set of characters of the string template.

23. The method as claimed in claim 22, further comprising the steps of:

assigning at least one character of the alphabet an insertion cost that determines the cost of inserting the character into the first string, and assigning at least one of the pairs of characters of the alphabet a substitution cost that determines the cost of substituting the two characters.

24. The method as claimed in claim 23, further comprising the step of determining the cost associated with an edit operation involving a set of characters of the string template using the assigned cost of a character of the set of characters.

25. The method as claimed in claim 23, further comprising the steps of assigning each character of the alphabet a corresponding model character associated with the optical character recognition process, and making the substitution cost of a pair of characters a function of a similarity score between the model characters corresponding to the characters of the pair.

26. The method as claimed in claim 22, wherein a character of the first string has a confidence attribute associated with the optical character recognition process that determines at least one of the cost associated with deleting a character of the first string and the cost associated with substituting a character of the first string by a set of characters of the string template.

27. The method as claimed in claim 22, wherein the method is performed according to a dynamic programming algorithm.

28. The method as claimed in claim 22, wherein the string template is of variable length and has a minimum length and a maximum length.

29. The method of claim 1, wherein the first string represents the characters of one of a license plate number, a serial number, or a postal code.

30. The method of claim 8, wherein the first string represents the characters of one of a license plate number, a serial number, or a postal code.

* * * * *